No. 697,804. Patented Apr. 15, 1902.
L. N. CAMPBELL.
KNEADING DEVICE.
(Application filed Sept. 11, 1901.)
(No Model.)
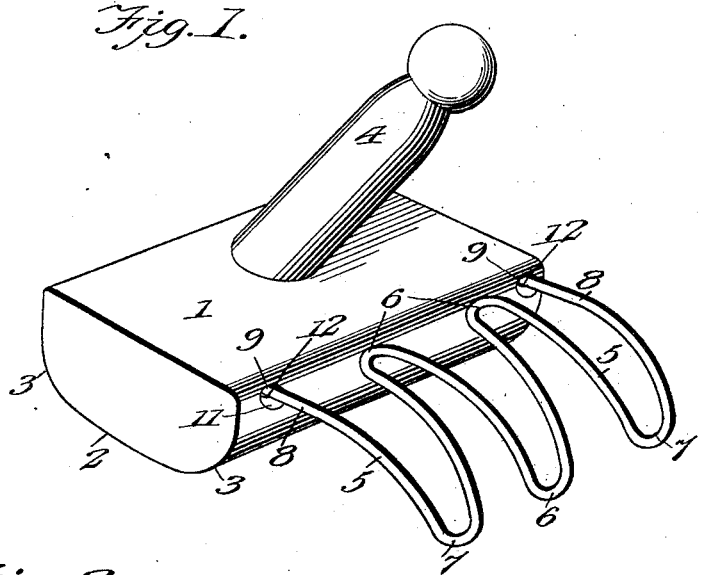
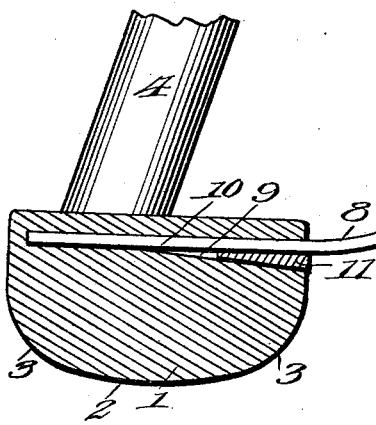
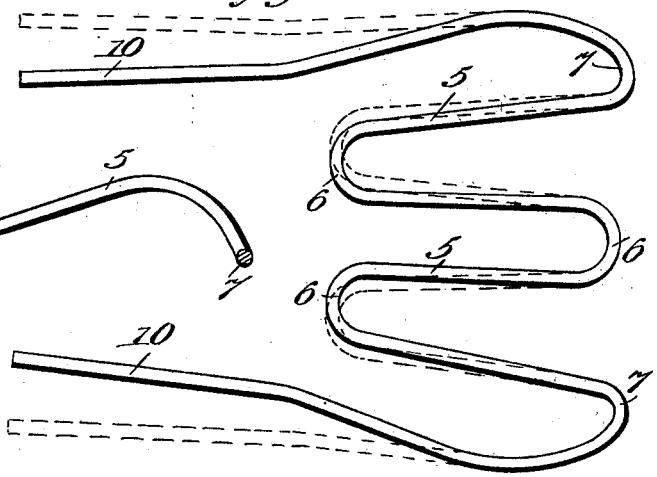
Ljenemma N. Campbell  Inventor
Witnesses
Edwin G. McKee
W. Arthur Maddox,
By Victor J. Evans
Attorney

UNITED STATES PATENT OFFICE.

LIENEMMA N. CAMPBELL, OF ALDEN, MICHIGAN.

KNEADING DEVICE.

SPECIFICATION forming part of Letters Patent No. 697,804, dated April 15, 1902.

Application filed September 11, 1901. Serial No. 75,078. (No model.)

*To all whom it may concern:*

Be it known that I, LIENEMMA N. CAMPBELL, a citizen of the United States, residing at and whose post-office address is Alden, (box 47,) in the county of Antrim and State of Michigan, have invented new and useful Improvements in Kneading Devices, of which the following is a specification.

My invention relates to kneading devices, and more particularly to a device especially adapted for kneading dough, the primary object being to provide means whereby dough may be kneaded without soiling the hands and in less time than is required for the ordinary hand-kneading.

The construction of the improvement will be fully described hereinafter in connection with the accompanying drawings, which form part of this specification, and its novel features will be defined in the appended claims.

In the drawings, Figure 1 is a view in perspective of a kneader embodying the invention. Fig. 2 is a vertical section of the same, and Fig. 3 shows the fingers detached from the block.

The reference-numeral 1 designates a block constituting the body of the implement and preferably rounded on its under surface 2 and sides 3. The upper surface of the block or body 1 is provided midway of its ends with an inclined socket to receive a handle 4, which, as clearly shown in the drawings, projects at an angle to the body, affording a more convenient hand-grasp than would be provided if the handle were perpendicular.

Projecting from the front upper edge of the block 1 is a series of fingers 5, formed from a single piece of heavy wire bent to form the front loops 6 and the intermediate rear loops 7 and having its ends 8 inserted into openings 9 formed in the block and extending nearly entirely across the latter, as shown. The fingers 5 are curved downward to adapt them to grasp the dough in kneading, and by manipulating the implement by its handle the usual hand movement can be simulated and the kneading accomplished without touching the dough with the hands. The wire forming the fingers is resilient, and before application to the block the extended arms 10 of the wire are in the position shown by full lines in Fig. 3. To insert them into the openings 9, it is necessary to bend the ends out to parallel relation, as shown by dotted lines in Fig. 3. Thus the tendency of the arms is to hug the inner walls of the openings 9, which aids in sustaining the arms in position. The arms 10 are further secured by wedges 11, each preferably formed with a semicircular groove 12, conforming to the shape of the wire arms.

While the device constructed as above described is especially adapted for use as a kneader, it is also serviceable for mixing pastry of all kinds and as a general kitchen accessory.

I claim—

1. A kneader comprising a block, a handle projecting upward therefrom, and a series of fingers projecting from said block and curved downward.

2. A kneader comprising a block, a handle projecting from the upper surface thereof, at an angle to said surface, and a wire bent to form a plurality of downwardly-curved loops, the ends of said wire being secured to the block.

3. A kneader comprising a block and handle, said block having transverse horizontal openings, and a resilient wire bent to form downwardly-curved loops serving as fingers, and having their ends inserted in said openings and secured therein.

In testimony whereof I affix my signature in presence of two witnesses.

LIENEMMA N. CAMPBELL.

Witnesses:
   WM. C. CAMPBELL,
   ESSIE M. ROSSITER.